United States Patent
Scholl et al.

(10) Patent No.: US 6,247,448 B1
(45) Date of Patent: Jun. 19, 2001

(54) CLOSED LOOP SPARK CONTROL METHOD AND SYSTEM UTILIZING A COMBUSTION EVENT SENSOR TO DETERMINE BORDERLINE KNOCK

(75) Inventors: David James Scholl, Huntington Woods; Kevin Ronald Carlstrom, Dearborn Heights, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/312,904

(22) Filed: May 17, 1999

(51) Int. Cl.$^7$ .................................................. F02D 5/00
(52) U.S. Cl. ................... 123/406.33; 123/406.64; 123/406.21; 123/406.22
(58) Field of Search ............ 123/406.21, 406.22, 123/406.23, 406.26, 406.29, 406.33, 406.41, 406.64

(56) References Cited

U.S. PATENT DOCUMENTS

| | | | |
|---|---|---|---|
| 4,527,524 | 7/1985 | Guipaud | 123/425 |
| 4,541,382 | 9/1985 | Hosoe et al. | 123/425 |
| 4,699,106 | 10/1987 | Haraguchi et al. | 123/425 |
| 4,700,677 * | 10/1987 | Bonitz et al. | 123/425 |
| 4,809,660 | 3/1989 | Marsh et al. | 123/417 |
| 4,825,832 | 5/1989 | Satoh et al. | 123/425 |
| 4,829,962 * | 5/1989 | Hafner et al. | 123/425 |
| 4,896,639 * | 1/1990 | Holmes | 123/419 |
| 4,936,276 | 6/1990 | Gopp | 123/425 |
| 4,971,007 | 11/1990 | Gopp et al. | 123/425 |
| 5,033,417 * | 7/1991 | Van Basshuysen et al. | 123/52 MB |
| 5,035,219 * | 7/1991 | Ohkumo et al. | 123/425 |
| 5,233,962 | 8/1993 | Fodale et al. | 123/425 |
| 5,243,942 | 9/1993 | Entenmann et al. | 123/425 |
| 5,421,304 | 6/1995 | Gibtner et al. | 123/425 |
| 5,535,722 | 7/1996 | Graessley et al. | 123/425 |
| 5,645,034 | 7/1997 | Entenmann et al. | 123/425 |
| 5,771,862 | 6/1998 | Unland et al. | 123/425 |

\* cited by examiner

Primary Examiner—Erick Solis
(74) Attorney, Agent, or Firm—Jerome R. Drouillard

(57) ABSTRACT

A method and system to determine the borderline spark timing for a given speed and load of a given cylinder and control spark timing relative to that borderline spark timing to maintain the torque/efficiency of the engine. The system measures combustion related events at several steps from a retarded spark timing to a spark timing signal which is calculated to be beyond the borderline spark timing value. From these measurements, the borderline spark timing signal for a given cylinder at a given speed and load is determined and saved. Borderline spark timing is the spark timing at which audible knock starts to occur.

10 Claims, 3 Drawing Sheets

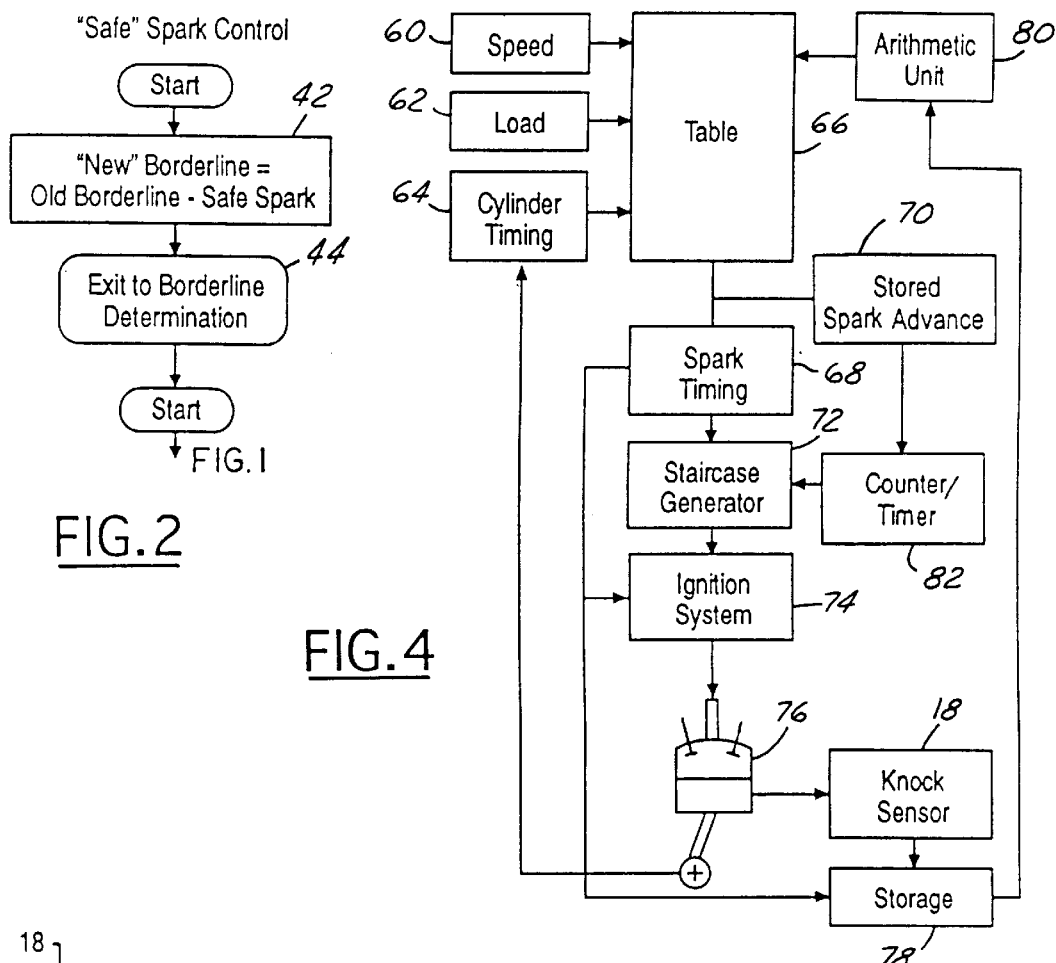
FIG. 2
FIG. 4
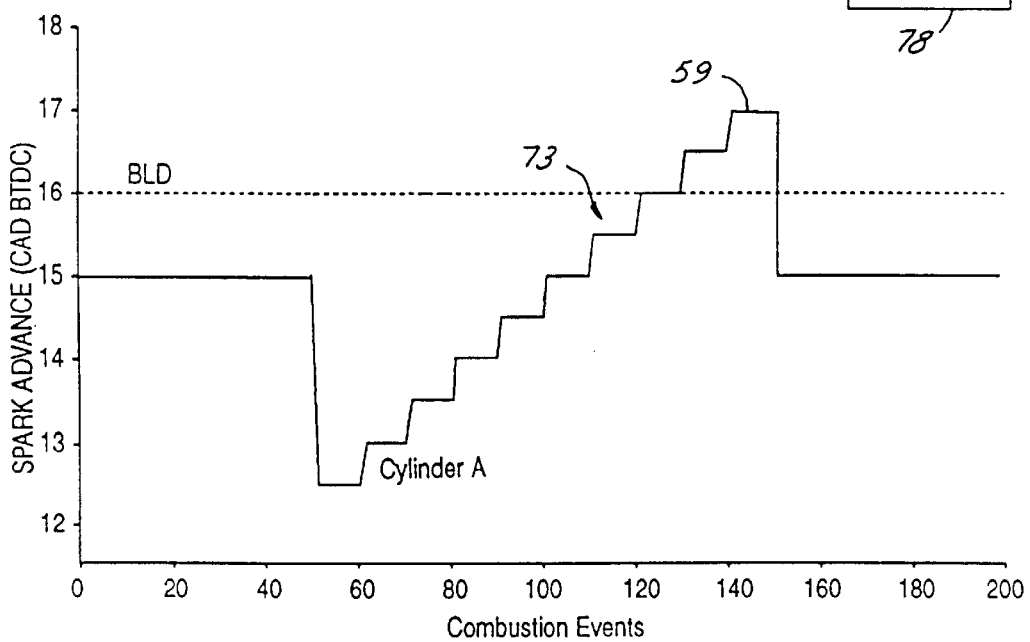
FIG. 3

CLOSED LOOP SPARK CONTROL METHOD AND SYSTEM UTILIZING A COMBUSTION EVENT SENSOR TO DETERMINE BORDERLINE KNOCK

BACKGROUND OF THE INVENTION

1. Field of the Invention

This invention relates to engine control systems in general and more particularly to a closed loop spark control system and algorithm operating around borderline knock spark timing and using the characteristics of a sensor related to combustion quality to determine the borderline knock spark timing.

2. Description of the Related Art

Spark timing in current production engines may be under open loop or closed loop control. If open loop, the spark timing is determined by calibrated look-up tables and calculated algorithms based on overall engine operating parameters and control inputs. If this method is used, the spark timing must be conservative (retarded) enough in order that the engine will not knock under worst-case conditions of compression ratio, fuel octane, combustion chamber deposits, and humidity. Since worst-case conditions are rare, retarded spark timing most or possibly all of the time will artificially reduce engine torque/efficiency.

To regain this torque/efficiency and maintain protection under worst-case conditions, many programs put the spark timing under closed loop control with a knock detection system. In some cases the same open loop spark tables are used to determine spark advance, and if knock is detected spark is retarded from that spark advance. Spark is then advanced if no further knocking events are detected until the original reference is reached. If more knocking events are detected, then spark is retarded further.

In other cases, the spark timing look-up tables contain upper and lower limits for different overall engine operating parameters, and feedback from the knock detector is used to find the optimal spark advance within those limits. The desired setpoint is the limit of knock audibility or the threshold of knock-induced piston damage or maximum engine torque, whichever comes first.

In both closed-loop cases the control strategy is arranged so that the knock detection system classifies each combustion event as knocking or non-knocking. If a combustion event is classified as non-knocking, the spark timing is advanced or maintained for the next engine cycle. However, if a combustion event is classified as knocking, the spark timing is retarded for the next engine cycle. There are many implementations of such strategies which differ in the details of how far and how fast the spark is advanced or retarded as well as how the knocking/non-knocking classification is made. Some systems maintain running averages and statistical measures of the individual cycle results for self-calibration purposes, and it is common to treat the knocking and non-knocking cycles differently in these statistical calculations.

U.S. Pat. No. 4,527,524 issued to Guipaud on Jul. 9, 1985, teaches the amount of spark retard used is based on the number of knock events detected and the rate used to advance spark after a knock event. Less spark retard is used with each successive knock event. Spark is advanced at an increasing rate if knock is not detected as the original spark advance is reached. This system relates strictly to spark advance/retard strategy with no mention of how an event is declared knocking or non-knocking. There is no attempt to correlate spark advance to actual borderline knock spark timing value.

U.S. Pat. No. 4,971,007 issued on Nov. 20, 1990 to Gopp et al. and assigned to a common assignee, is concerned both with finding the knock threshold and finding "Minimum spark for Best Torque", MBT. The knock threshold is detected by counting the number of engine cycles between successive knocking events. The system is not designed to optimize knock threshold accuracy.

These and other prior art systems do not attempt to correlate knock to actual borderline spark advance values. In addition the prior art systems are not designed to optimize knock threshold accuracy.

SUMMARY OF THE INVENTION

A common feature of the existing prior art systems is that the knocking/non-knocking classification does not make use of a valuable piece of information, namely the value of spark timing in effect when each cycle was measured.

It is therefore a principal advantage of the system to control spark timing directly by the powertrain control module, wherein the value of spark timing in effect when each cycle is measured is readily available on a cycle resolved basis.

It is another advantage of the system described and defined herein to use a knock sensor or some similar sensor, to determine borderline knock spark timing relative to the location of borderline knock.

It is still another advantage of the system to define on either a cylinder by cylinder basis or on a global basis, the optimum spark timing to accomplish ignition without engine knock by optimizing knock threshold accuracy.

It is yet another advantage of this system to determine and use borderline knock spark timing to maximize ignition timing without engine knock.

The invention is a method and system for determining borderline knock in an internal combustion engine such as may be found in motor vehicles. The method sets the spark timing at a value equal to a predetermined borderline spark timing angle minus a fixed number of crankshaft angle degrees. Spark timing is advanced in a staircase manner by an incremental number of crankshaft angle degrees in each step. The signal amplitude of a combustion-related event at each staircase step is measured. The slope is calculated between the measured signal amplitude at each staircase step with the prior staircase step signal amplitude. Finally the staircase step angular value is identified as the borderline knock spark timing wherein the calculated slope becomes greater than a predetermined value of slope.

BRIEF DESCRIPTION OF THE DRAWINGS

In the drawings:

FIG. 2 is an additional flow chart depending from a result of one of the steps of FIG. 1;

FIG. 3 is an illustration of the staircase ignition timing signal applied to a given cylinder;

FIG. 4 is a block diagram of the system of FIG. 1; and

DETAILED DESCRIPTION OF THE PREFERRED EMBODIMENT

There is disclosed and claimed a closed-loop spark control system and algorithm that uses a knock sensor, or other similar sensor, to determine borderline knock spark advance.

Spark advance is varied within upper and lower limits in a predefined manner and one or more characteristics of the knock detector signal are recorded as a function of spark advance. Examination of this spark timing dependence reveals the location of borderline knock. In the preferred embodiment the maximum amplitude of a detected signal as a result of a combustion event at a given spark angle is the knock sensor parameter used for spark control, but there may be other, equally appropriate characteristics that could be used. Once borderline knock is determined, spark timing is fixed at or near the borderline knock until engine conditions such as speed and load change.

It has been found that the following are at least six characteristics of an engine operating at borderline knock.

(a) First, borderline knock spark advance is the spark advance at which audible knock starts to occur.

(b) Second, the audible intensity of borderline knock is of relatively low amplitude.

(c) Third, the frequency of audible knock is low, about one knock event in one hundred combustion events or less.

(d) Fourth, if the absolute spark advance is the same for all cylinders, usually only one or two cylinders are contributing to knock, the rest are below their knock limit; hence below their engine torque/efficiency.

(e) Fifth, when the engine is at borderline knock spark timing, if a cylinder knocks during a given cycle, borderline knock frequency is such that the same cylinder is unlikely to knock on the next combustion cycle.

(d) Sixth, knock intensity and frequency increase as spark timing is advanced past borderline knock.

Figure 1:
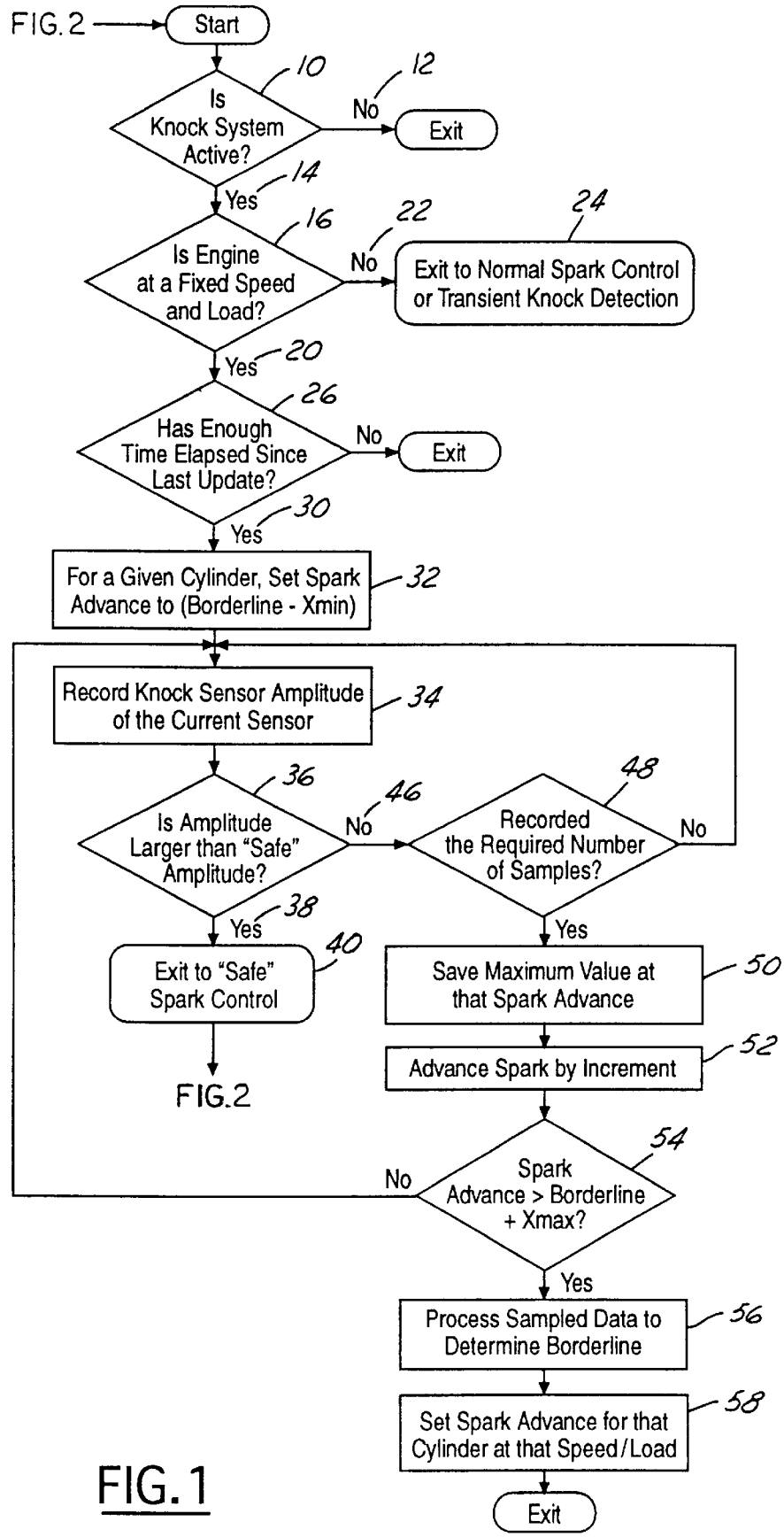
FIG. 1 is a flow chart of the method of the invention.

Referring to the Figs by the characters of reference the flow chart of FIG. 1 represents the steps of an algorithm necessary to determine the borderline knock spark advance for a given cylinder at a steady speed and load. In the first step, 10 it is determined if the knock system is active. If it is not 12, the program exits. If it is active 14, then the decision output is YES and the flow chart continues to the second step 16.

In the system, the main sensor used is called, for ease of discussion, a knock sensor 18 (FIG. 4). However such a sensor 18 may be one of a variety of sensors which respond to a quality combustion event. A cylinder pressure sensor is one such sensor as are various accelerometers, an in-cylinder ionization probe or any other sensor that is capable of detecting an engine knock characteristic. Other combustion intensity sensors may measure engine block vibration including exhaust temperature sensors.

In the second step 18, it is determined if the engine is at a fixed speed and load. If YES 20, then the flow chart continues and if NO 22, then the system will exit to the normal spark control or transient knock detection 24.

Moving on to the third step 26, a timer will be used to determine if enough time has elapsed since the last update. If enough time has elapsed, YES 30, so that the next update does not fall too close to the last data collection, the flow chart advances to the fourth step 32. In the fourth step 32 a given cylinder is defined and the spark advance is set to a value equal to borderline knock spark timing minus some fixed amount of crank angle degrees, CAD.

FIG. 3 illustrates a graphic representation of this step of retarding the spark from a present spark timing of fifteen crank angle degrees (15 CAD) a predetermined number of crank angle degrees. In FIG. 3, cylinder "A" is retarded to twelve and one-half crank angle degrees.

In the fifth step 34, the knock sensor 18 measures a signal amplitude of a combustion-related event at this new spark timing. This amplitude is stored. Next the spark timing is advanced by a staircase signal 53 by a predetermined number of crank angle degrees. In this embodiment, each step of the staircase signal is one-half CAD and the sensor measures the signal amplitude of the combustion-related event at this new spark timing. The amplitude of the signal is compared with safe amplitude in the sixth step 36.

If the amplitude is larger 38 than the safe amplitude, the process exits to "Safe" spark control 40, FIG. 2. In the process of FIG. 2, a new borderline spark timing value is selected. The process takes the borderline spark timing from the value used in the sixth step 36 and retards that value by amount equal to a designed "safe spark" value in the step 42 of FIG. 2. This is now a new borderline knock spark timing value and the process then exits 44 and returns to the first step 10 in FIG. 1.

If the amplitude is less than the safe amplitude 46, the process of FIG. 1 continues until the spark timing has advanced beyond where the engine designer believes that borderline knock spark timing occurs. This is illustrated in steps seven to twelve, 48–58 in FIG. 1. In FIG. 3, the result of the tenth step 54 is illustrated as seventeen CAD that is one CAD beyond a designed value of borderline knock, "BLD". The slope between each of these stored amplitudes is calculated in the eleventh step 56 and compared to a predetermined slope. When the first slope is found to be greater than the predetermined slope, the number of CAD at the beginning of the slope is determined to be the borderline knock spark timing for the tested cylinder at the speed and load values. This is illustrated in the twelfth step 58.

Figure 5:
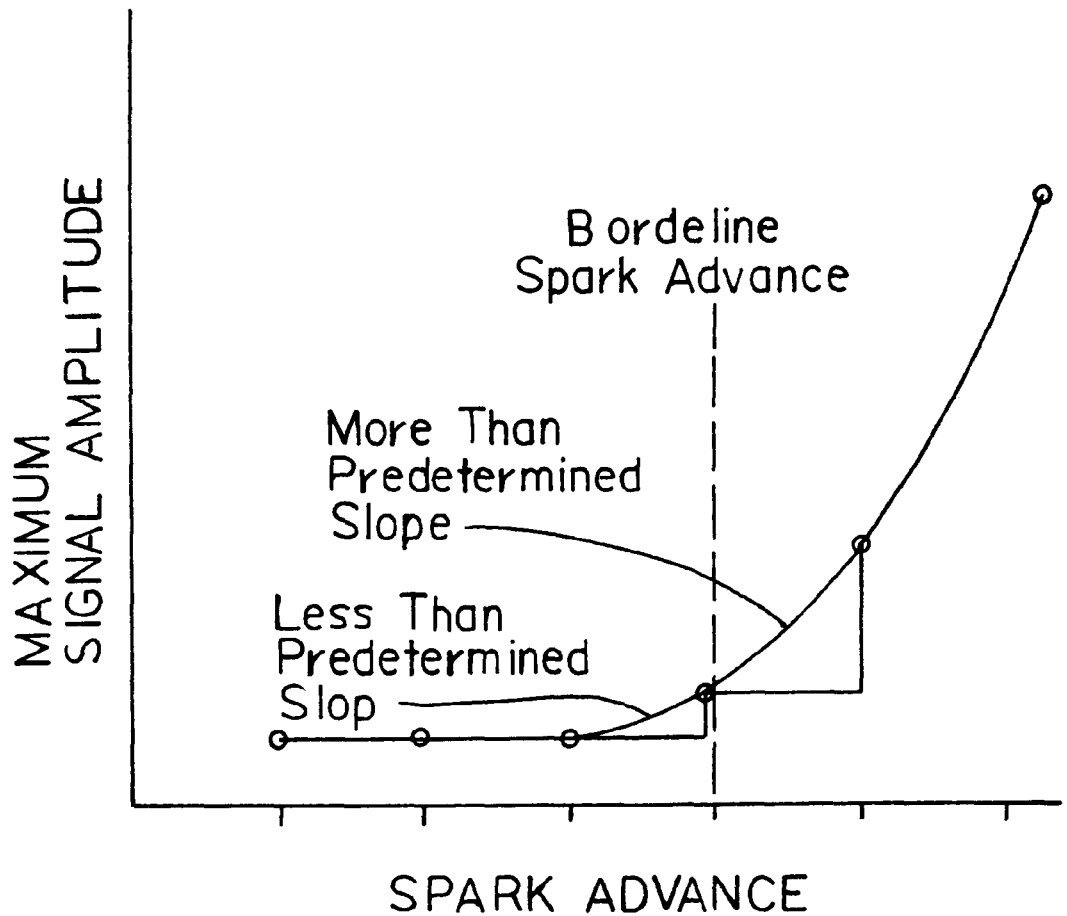
FIG. 5 is an illustration of the borderline knock determination according to the method of the invention.

FIG. 5 illustrates in graphic form, the concept of slopes of each step of the staircase signal. As the steps advance toward the borderline knock, the amplitude becomes greater. The slope value of the step is defined as being from the beginning of the step until the height of the amplitude at the end of the step. The ordinate of FIG. 5 is the maximum signal amplitude and the abscissa is the spark advance in CAD. As illustrated, when the slope value of one step is less than a predetermined slope value, spark timing is retarded from the borderline knock spark timing signal. However, when the slope value, for the first time, is greater than a predetermined slope value, the borderline knock spark timing is defined as the spark advance at the beginning of the step.

In order to have a better sampling, the algorithm, in the sixth step 36, checks the measured amplitude with a "safe" amplitude as determined by the engine designer. If the amplitude is less 46, the flow chart moves to the seventh step 48 and repeats the steps of measuring and saving for a predetermined number of successive ignition or combustion events before advancing the spark timing.

There are many ways of saving the amplitudes during successive measuring, but one such method is to store the first amplitude and thereafter only store larger amplitudes. The desire is to have the largest signal amplitude for each staircase step of advancing the spark timing.

Again once the spark advance is greater than borderline knock spark timing plus a predetermined number of CADs, the saved data, in the form of the signal amplitudes is processed to determine borderline knock spark timing. Once borderline knock spark timing is determined, the spark advance for that cylinder at that speed and load is stored in a look-up table and is used for the spark advance under the conditions set or found in the second step 16.

If the engine is a multiple cylinder engine, the algorithm repeats the fifth step 36 through the twelfth step 58 with the cylinder number changed. The process of retarding the spark advance and measuring the signal amplitude and saving the measurements for the desired number of samples is begun. This continues until the new cylinder spark advance is greater than borderline knock spark timing plus a predetermined number of CADs is reached. At that time the signal amplitude slopes are determined and the borderline knock spark timing is determined for that cylinder and stored in the look-up table.

Referring to FIG. 4 there is illustrated a spark timing control system for determining and storing spark timing adjacent to borderline knock for generating the maximum torque/efficiency in an internal combustion engine. An engine speed sensor 60 measures engine speed and generates an engine speed signal. An engine load sensor 62 measures engine load and generates an engine load signal. The present engine cylinder 64 is identified and a signal is generated identifying the engine cylinder.

A look-up table 66 responds to the engine speed, engine load and cylinder signals and outputs a signal to a spark-timing generator 68 for generating a spark timing signal. A memory storage 70 has a predetermined spark advance signal responsive to the spark timing signal generated by the look-up table 66 to generate a new testing spark timing signal advanced from the spark timing signal. A staircase timing signal generating means 72 is responsive to the new testing spark timing signal to generate a staircase timing signal 73. The staircase timing signal has steps equal to or less than one crank angle degree extending from the retarded spark timing crank angle degree to a predetermined spark timing advance crank angle degree. The size of the steps is under the control of the system designer.

Ignition timing means located in the ignition system 74 responds to the staircase timing signal 73 to generate an ignition event at each step. A combusting quality sensor 18 responds to combustion quality events in the cylinder 76 and generates an electrical signal having one or more signal amplitudes.

Another storage means 78 stores the value of the greatest signal amplitude for each step of the staircase timing signal. Arithmetic unit 80 responsive to the another storage means 78 to determine the slope between the greatest signal amplitude at adjacent steps. In addition the arithmetic unit 80 responds to all of the slopes to generate a single slope signal representing a maximum slope and the crank angle degrees at the lowest retarded step having the maximum slope.

A portion of the look-up table 66 responds to the engine speed, engine load and cylinder signals for storing the generated slope signal from the arithmetic unit 80 that represents the borderline knock spark timing for the cylinder at the tested speed and load.

The ignition timing that responds to the staircase timing signal 73 includes a counter 82 for counting a predetermined number of ignition events at each staircase step before stepping to the next step of the staircase timing signal 73.

The another storage means 78 for storing the value of the greatest signal amplitude for each step of the staircase timing signal 73 includes means for determining the value of greatest amplitude for the predetermined number of ignition events on each step and stores that value.

There has thus been described and illustrated a closed loop spark control method and system utilizing a combustion event sensor to determine borderline knock spark timing in an internal combustion engine. To operate spark control at the borderline knock spark timing for each cylinder at a given speed and load operates to maintain the torque/efficiency of the engine.

What is claimed is:

1. A method for determining borderline knock spark timing in an internal combustion engine comprising the steps of:
   setting spark advance at a value equal to a predetermined borderline spark timing angle minus a fixed number of crankshaft angle degrees;
   staircase advancing the spark timing angle by an incremental number of crankshaft angle degrees;
   measuring the signal amplitude of a combustion-related event at each staircase step;
   calculating the slope between the measured signal amplitude at each staircase step with the prior staircase step signal amplitude;
   identifying the staircase step angular value as the borderline knock spark timing wherein the calculated slope becomes greater than a predetermined value of slope; and then
   storing the identified staircase step angular value as said predetermined borderline spark timing angle.

2. A method for determining borderline knock in an internal combustion engine comprising the steps of:
   (a) looking up in a look-up table the stored borderline spark timing angle for present cylinder for the present speed of and load on the engine;
   (b) retarding the stored spark timing angle a predetermined number of crank angle degrees to form an initial spark timing angle;
   (c) staircase advancing the spark timing by predetermined degree increment steps from the initial spark timing angle to a predetermine spark timing angle;
   (d) measuring the signal amplitude of a combustion related sensor responding to an ignition event at each staircase step;
   (e) saving the measured signal amplitudes;
   (f) calculating the slope between adjacent stored signal amplitudes;
   (g) identifying the staircase step angular value as the borderline knock spark timing wherein the calculated slope becomes greater than a predetermined value of slope; and then
   (h) storing in a look-up table the identified staircase step angular value as the borderline knock spark timing for the present cylinder.

3. In the method of claim 2 additionally including the following step prior to step (f)
   (e1) repeating steps (d) and (e) a predetermined number of successive ignition events and saving the largest measured signal amplitude at each staircase step before advancing to step (f) for providing a predetermined number of samples at each staircase step spark timing degree.

4. In the method according to claim 2 wherein the step (e) saving the measured signal amplitude additionally includes the step of determining the greatest signal amplitude at each staircase step spark timing degree.

5. In the method according to claim 2 additionally including the step of determining a new speed of and load on the engine and repeating steps (a) to (h) for generating a look-up table of borderline knock spark advance timing for the cylinder at a new speed and load of the engine.

6. In the method according to claim 2 additionally including the step of:
   (i) incrementing the cylinder number and repeating steps (a) through (h) until all cylinders have been measured at the present speed of and load on the engine.

7. In the method of claim 6 additionally including the following step prior to step (f)

(e1) repeating steps (d) and (e) a predetermined number of successive ignition events and saving the largest measured signal amplitude before advancing to step (f) for providing a predetermined number of samples at each staircase step spark timing degree.

8. In the method according to claim 6 where in step (e) saving the measured signal amplitude additionally includes the step of determining the greatest signal amplitude at each staircase step spark timing degree.

9. In the method according to claim 6 additionally including the step of determining a new speed of and load on the engine and repeating steps (b) to (h) for generating a look-up table of borderline knock spark advance timing for each cylinder at a new speed and load of the engine.

10. A spark timing system for determining and storing borderline knock spark timing for generating the maximum torque in an internal combustion engine:

a look-up table responding to engine speed, engine load and engine cylinder number for generating a borderline knock spark timing signal;

storage means having predetermined spark retarding signal responsive to said borderline knock spark timing signal generated by said look-up table for generating a new testing spark timing signal retarded from said borderline knock spark timing signal;

means responsive to said new testing spark timing signal for generating a staircase timing signal extending from said new testing spark timing crank angle degree to a predetermined spark timing advanced crank angle degree;

ignition timing means responsive to said staircase timing signal for generating an ignition event at each staircase step;

a sensor responding to combustion quality events in said cylinder and for generating an electrical signal having a signal amplitude;

means for calculating the slope value between said signal amplitudes at adjacent steps;

identifying means responding to all said calculated slope values for generating a timing signal representing the crank angle degrees when a calculated slope value is greater than a predetermined slope value; and a look-up table for storing said generated timing signal representing the borderline knock spark timing for said cylinder at said speed and load.

\* \* \* \* \*